(12) United States Patent
Pettitt (10) Patent No.: US 6,256,073 B1
(45) Date of Patent: Jul. 3, 2001

(54) COLOR SOURCE SELECTION FOR IMPROVED BRIGHTNESS

(75) Inventor: Gregory S. Pettitt, Rowlett, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/197,923

(22) Filed: Nov. 23, 1998

Related U.S. Application Data (60) Provisional application No. 60/066,805, filed on Nov. 26, 1997.

(51) Int. Cl.[7] .......................................... H04N 9/12
(52) U.S. Cl. ........................ 348/743; 348/750; 348/742
(58) Field of Search ................................. 348/742, 743, 348/750, 751, 752, 755, 756, 771; 362/812, 293, 230, 231

(56) References Cited

U.S. PATENT DOCUMENTS

| | | | | |
|---|---|---|---|---|
| 5,440,352 | * | 8/1995 | Deter ..................................... | 348/750 |
| 5,704,700 | * | 1/1998 | Kappel et al. ....................... | 348/771 |
| 5,828,424 | * | 10/1998 | Wallenstein ......................... | 348/760 |
| 5,903,323 | * | 5/1999 | Ernstoff et al. ...................... | 348/771 |
| 6,002,452 | * | 12/1999 | Morgan ................................ | 348/742 |
| 6,046,782 | * | 4/2000 | Hayakawa ............................ | 348/742 |
| 6,067,128 | * | 5/2000 | Imai ..................................... | 348/751 |
| 6,069,671 | * | 5/2000 | Lee et al. ............................. | 348/659 |
| 6,108,053 | * | 8/2000 | Pettitt et al. ......................... | 348/743 |

\* cited by examiner

*Primary Examiner*—Reinhard J. Eisenzopf
*Assistant Examiner*—Brian P Yenke
(74) *Attorney, Agent, or Firm*—Charles A. Brill; Wade James Brady, III; Frederick J. Telecky, Jr.

(57) ABSTRACT

A method of selecting a set of color sources for an image display system, the image display system creating a color image from at least three single-color color sources. According to one embodiment of the present invention, the method comprises selecting a first, second, and third color source. The first and second color sources are divided into a high-efficiency group and a low-efficiency group based on the efficiency of the color source. If the first color source is selected from the high-efficiency group (1102), the second color source may be selected from either the high-efficiency group or the low-efficiency group (1104). If the first color source is selected from the low efficiency group (1102), the second color source is selected from the high-efficiency group (1106). According to one embodiment of the present invention, the third color source is selected (1108) without first sorting the third color sources into high and low-efficiency groups.

31 Claims, 6 Drawing Sheets

COLOR SOURCE SELECTION FOR IMPROVED BRIGHTNESS

This application claims priority under 35 USC § 19(e)(1) of provisional application number 60/066,805 filed Nov. 26, 1997.

FIELD OF THE INVENTION

This invention relates to the field of image display systems, more particularly to methods and systems for selecting image display system color sources to increase system brightness.

BACKGROUND OF THE INVENTION

Image display systems create images by emitting, or modulating, light. The light forms an array of picture elements, or pixels, which together form a viewable image. Full-color images are created by either simultaneously or serially creating three independent single-color images. Cathode ray tube (CRT) based display systems use three electron guns to simultaneously stimulate three color generating regions for each pixel on the CRT screen. These three colors must be selected carefully in order to ensure that combinations of the colors are able to accurately recreate the full-color image source.

Intensity, or image brightness, is only one of many metrics, including horizontal and vertical resolution, color purity, display size, frame rate, and immunity from device created image artifacts, by which display systems are judged. Some of these characteristics are more important to consumers, either because they create a noticeably superior image, or simply because they differentiate between the systems on display in a store. Brightness is one metric that is extremely important to purchasers of display systems. Therefore, system designers must attempt to increase brightness in order to satisfy consumers and increase sales.

One factor that contributes directly to image brightness, is the available brightness of the light sources used to generate an image. Some systems may use colored light sources, others will use white light sources that are filtered to obtain the desired component colors. Filtering light necessarily reduces the useable brightness of the light source. The efficiency of the filters is a function of the wavelengths selected by the filter. Furthermore, the wavelengths selected by the filter impact the purity of the image produced by the display system. Therefore, an improved filter selection process will improve both the image brightness and color purity of a display system

SUMMARY OF THE INVENTION

Objects and advantages will be obvious, and will in part appear hereinafter and will be accomplished by the present invention which provides a method and system for an image display system having increased brightness and color purity. One embodiment of the claimed invention provides a method of selecting a set of color sources for an image display system wherein the image display system creates a color image from at least three single-color color sources. The method comprises providing multiple first and second color sources, the multiple first and second color sources each divided into a high-efficiency group and a low-efficiency group based on the color source's efficiency, and providing multiple third color sources. The method further comprising the step of selecting a first, second, and third color source from the multiple first, second, and third color sources such that either the first color source or the second color source, but not both, may be selected from the low-efficiency group. Alternative embodiments measure surrogate parameters to indirectly determine the efficiency of the color sources selected.

According to a second embodiment of the claimed invention, a method of selecting a set of color sources for an image display system is provided. The method comprising providing multiple first, second, and third color sources, testing the first and said second color sources, and selecting a first, second, and third color source. Each first color source for transmitting light over a first range of wavelengths. The first range of wavelengths comprised of a first sub-range and a second sub-range with the first sub-range comprising longer wavelengths than the second sub-range and having a higher optical efficiency than the second sub-range. Each second color source for transmitting light over a second range of wavelengths, the second range of wavelengths comprised of a first sub-range of the second range and a second sub-range of the second range, with the second sub-range of the second range comprising shorter wavelengths than the second sub-range of the second sub-range and having a higher optical efficiency. The selection of a first and second color source ensuring that a first color source from the second sub-range is never paired with a second color source from the first sub-range.

According to yet another embodiment of the present invention, a display system is provided. The display system comprises a first, second, and third color source, and at least one spatial light modulator for receiving light from the first, second, and third color sources, modulating the received light, and transmitting the modulated light to an image plane. The first and second color sources are chosen from a selection of first and second color sources, each selection divided into a high-efficiency group and a low-efficiently group, wherein not more than one of the first and second color sources are chosen from a low-efficiency group. Alternative embodiments measure surrogate parameters, such as the cut-off wavelength of the color source, to indirectly determine the efficiency of the color sources selected.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Display brightness and color purity are both important metrics by which the quality of a display system is judged. Display brightness and color purity both depend on the proper selection of color light sources from which an image is created. Color sources include both sources of light and devices that separate a single-color component beam from a white light beam Examples of such devices include organic and dichroic filters, as well as beam splitters and other prism assemblies which typically use optical coatings to selectively reflect or transmit certain wavelengths of light. Each color source provides a light having a single wavelength, or a limited range of wavelengths.

Monochromatic light is light having a single color and single wavelength. Few display systems, however, are capable of generating three truly monochromatic light components. Many more display systems rely on white light sources and separate or filter out various wavelengths to yield a single-color light beam. These single-color light beams are not monochromatic since truly monochromatic filters are both impractical and terribly inefficient in terms of use of the energy available from the white-light source.

Although each wavelength of light is technically an unique color, for the purposes of this disclosure the term single-color will not refer to monochromatic light, but rather to light having a range of wavelengths which are used as a single component color to generate a multi-color image. For example, light from 475 nm to 578 nm is characterized as green light by a human viewer, and may be used for the green component in color display systems using red, green, and blue (RGB) component colors to create full-color images.

Figure 5:
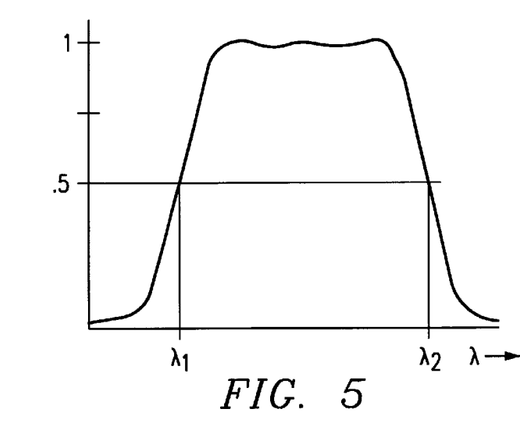
FIG. 5 is a normalized plot of the transmission profile of a typical color filter.
Figure 6:
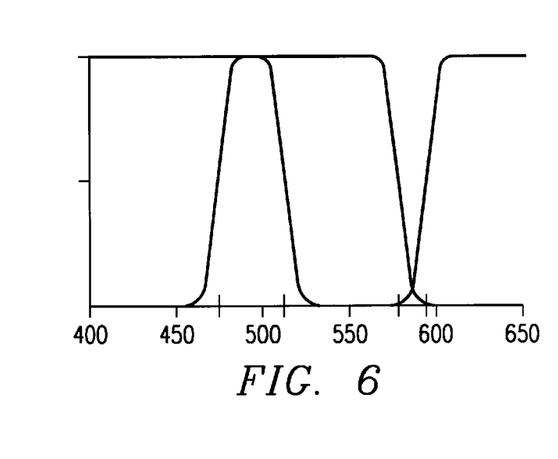
FIG. 6 is a normalized plot of the transmission profiles of three typical color filters.

Color source, in this disclosure, are described in terms of their 50% cutoff wavelengths. For example, the color source described by FIG. 5 has a shortwave cutoff of $\lambda_1$ and a longwave cutoff of $\lambda_2$. Although the color source of FIG. 5 is described as not transmitting wavelengths longer than $\lambda_2$, FIG. 5 clearly shows that longer wavelengths are in fact transmitted by the color source, albeit at less than half the power of the peak wavelengths. While the 50% cutoff wavelength will be used for purposes of illustration within this disclosure, other measurement standards may also be used. For example, color sources could be classified by their 10% or 90% cutoff wavelengths.

Figure 1:
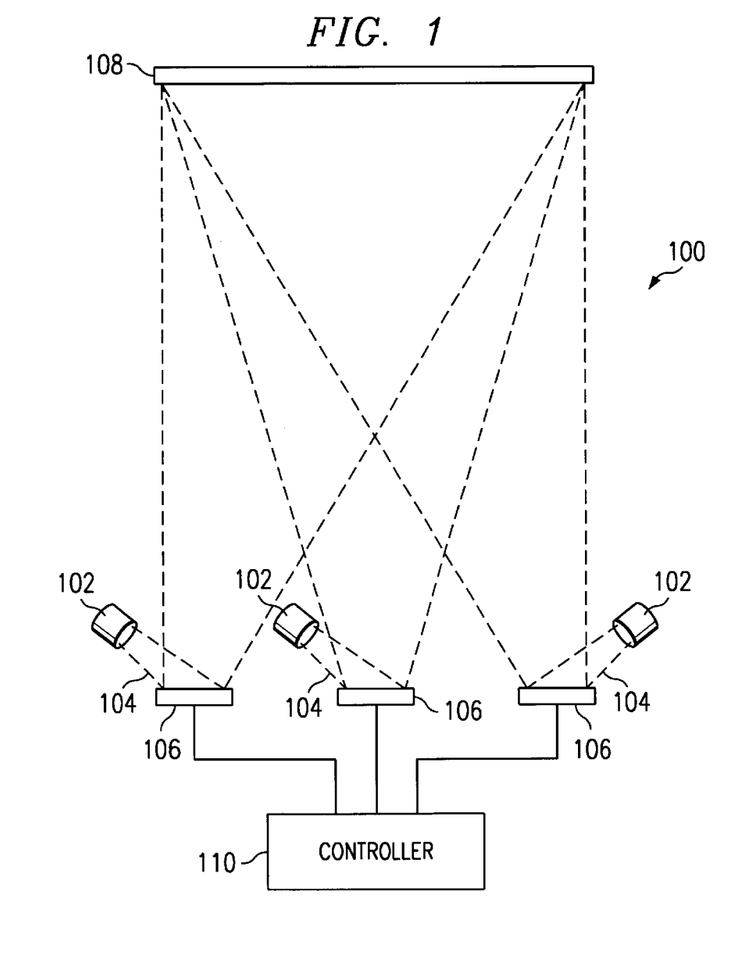
FIG. 1 is a schematic view of a color display system using three colored light sources.

FIG. 1 shows a simplified schematic view of a three-color image display system 100. In FIG. 1, three light sources 102 each generate a single-color beam of light 104. The single-color beam of light 104 is focussed onto a reflective light modulator 106. Each light modulator 106 selectively reflects portions of the incident beam of light onto a viewing screen 108 which could be the retina of a viewer's eye. Controller 110 synchronizes the operation of the three light modulators and transfers image data to the light modulators. The image data transferred to the modulators 106 determines which portions of the single-color beam of light 104 will be transmitted to the viewing screen 108 where they will contribute to the generated image.

Several factors influence the selection of color sources for image display systems. First, there may be a limited selection of sources from which to choose. This is especially true when using single color light sources as opposed to white light sources and color filters or beam splitters. Single color light sources in general, and laser sources in particular, may not be available to produce a wide selection of wavelengths.

A second factor that influences the selection of color source is the ability to mix the light sources to create all light colors, including white. If the color sources are not carefully selected to mix properly, the white light generated mixing light from each color source may have a slight color tint.

A third factor to consider, especially when using color filters or beam splitters to separate the component colors from white light, is the efficiency of the light filters or beam splitters, and their cumulative effect on the efficiency of the system and brightness of the displayed image. The white light efficiency, $CWE_{WHITE}$, is the amount of white light available by combining the output of the color filters, measured in lumens, divided by the amount of white light available from the light source. The white light efficiency is the sum of the efficiencies for each of the component colors, as shown by the following equations:

$$CWE_{WHITE} = CWE_{RED} + CWE_{GREEN} + CWE_{BLUE}$$

$$CWE_{RED} = Y_{CW\_RED}/Y_{CW\_OUT}$$

$$CWE_{GREEN} = Y_{CW\_GREEN}/Y_{CW\_OUT}$$

$$CWE_{BLUE} = Y_{CW\_BLUE}/Y_{CW\_OUT}$$

where: $CWE_{SPECTRUM}$=color wheel efficiency in spectrum $Y_{CW\_SPECTRUM}$=measured lumens with color filters in place for each spectrum $Y_{CW\_OUT}$=measured lumens with color wheel out of system The efficiency of a color filter depends primarily on cutoff wavelengths, and the type, or construction, of the filter selected. Furthermore, the efficiency of the display system is also a function of the interaction between the color filter and the light source, since the output spectrum of the light source determines how the available white light energy is spread across the color bands transmitted by the filters. Process variations occurring during the manufacture of color filters also alter the efficiency of each individual filter both by changing the transmission characteristics at a given wavelength and by changing the cutoff wavelengths of a filter.

Figure 2:
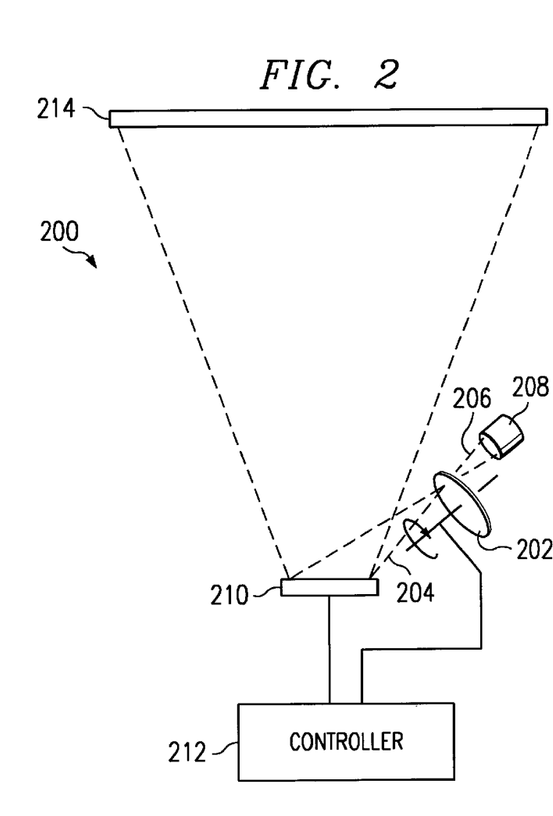
FIG. 2 is a schematic view of a color display system using a single light source and a color wheel.

FIG. 2 shows a simplified schematic view of a three-color image display system 200 which relies on a color wheel 202 to sequentially separate at least three single-color component light beams 204 from the white-light light beam 206 output by light source 208. The operation of light modulator 210 is synchronized to the rotation of the color wheel 202, which is driven by a motor (not shown), by controller 212. The three single-color component light beams 204 are sequentially modulated and projected onto viewing screen 214. When a human views the sequentially projected single-color images, the viewer's eye integrates the images such that the three single-color images appear to be a single full-color image. Although FIG. 2 shows a transmissive color wheel, reflective color filter wheels are also used.

Figure 3:
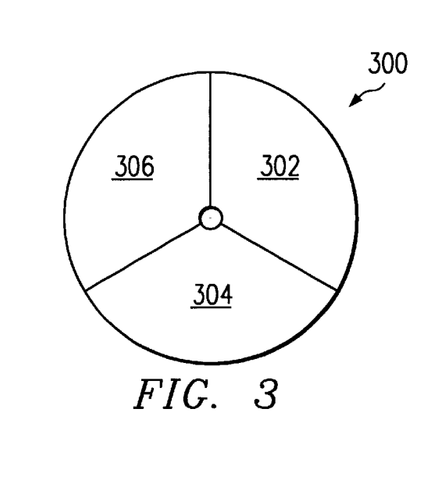
FIG. 3 is a plan view of a three-segment color wheel.
Figure 4:
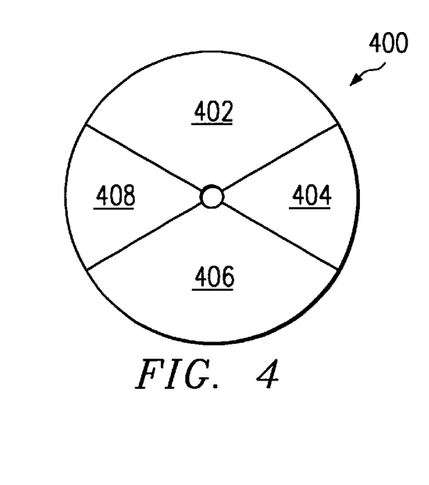
FIG. 4 is a plan view of a four-segment color wheel.

FIG. 3 shows a typical color wheel having three color filter segments 302, 304, and 306. Each color filter in the color wheel of FIG. 3, filters a white-light beam to yield a single-color light beam. Typically color wheels create red, green, and blue light beams. Color wheel 300 includes three equal sized segments. Other color wheels, however, such as the color wheel 400 of FIG. 4, may use additional segments or segments that are not equal sized. Color wheel 400 includes four filter segments 402, 404, 406, and 408. Increasing the number of color segments helps to avoid some artifacts created by sequential-color display systems. For example, using two of the segments of color wheel 400 to produce the same color light beam helps to reduce artifacts that occur when displaying moving images with a three-segment color wheel. Alternatively, a fourth segment is used to transmit white light. The white light is used to increase image brightness.

Color wheel filters are typically manufactured by producing a quantity of color filter material for each color of the color wheel and cutting sheets of the color filter material to the shape required by the color wheel. Color filters for each segment are then attached to either a central hub, or a hub/frame assembly. Since the processes by which the color filters are fabricated produce some variance in the characteristics of the filters produced, each color wheel exhibits some unique characteristics. The production of color wheel material requires very tight process controls, which increase the cost of the color wheels produced, in order to consistently produce color wheels which accurately reproduce input images.

FIG. 5 depicts a typical transmission curve for a color source which has been normalized to the maximum transmission response. The transmission response shown in FIG. 5 could be from a reflective color filter, transmissive color filter, or for a light source, although for the purposes of this discussion the filter is assumed to be a transmissive color filter. Optical filters are often far from ideal filters. As shown in FIG. 5, optical filters often do not have sharp cutoff points as the wavelength of the light incident the filter changes from the pass band to out of band. Furthermore, like other types of filters, optical filters are not perfectly efficient either in the pass band or well outside the pass band, that is the out of band energy is not totally rejected and the in band energy is not totally transmitted.

For a filter-based system, the color filters are selected to yield a maximum display brightness and white color purity when used with a specified light source. Since the efficiencies of the individual color filters are additive, and because the efficiencies are related to the cutoff wavelengths of the filters, the individual filter specifications are driven by the system brightness and color purity specifications. Specifications for the color filters of a typical display system are listed in Table 1. The color wheel formed by the filters specified in Table I has a minimum specified efficiency of 26.5%.

TABLE 1

| Filter | 50% Transmission Cut-off Wavelength | Tolerance: % of Cut-off Wavelength |
| --- | --- | --- |
| Blue | 513 nm | 2% |
| Green (shortwave) | 475 nm | 2% |
| Green (longwave) | 578 nm | 1% |
| Red | 595 nm | 1% |

Figure 7:
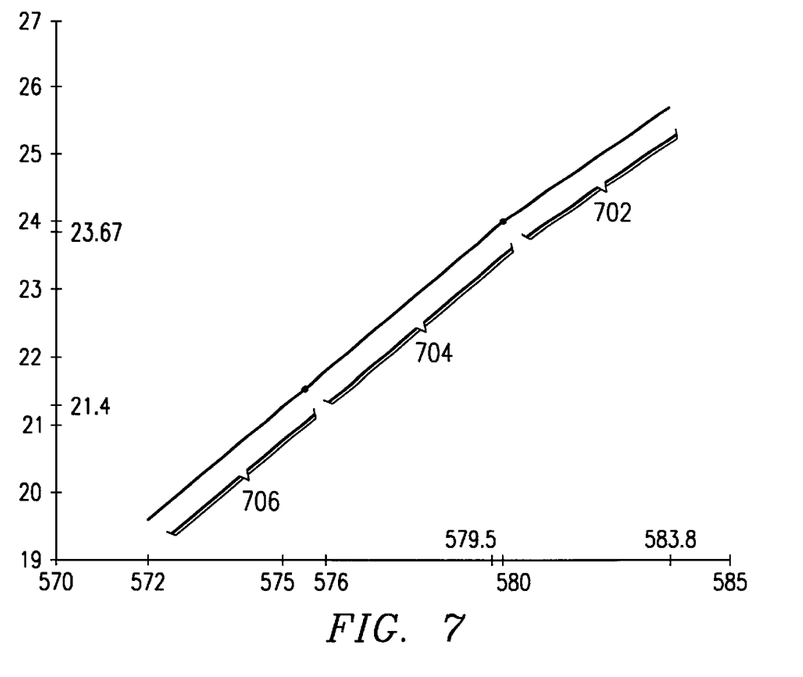
FIG. 7 is a plot showing the relationship between efficiency and cutoff wavelength for a typical green filter.
Figure 8:
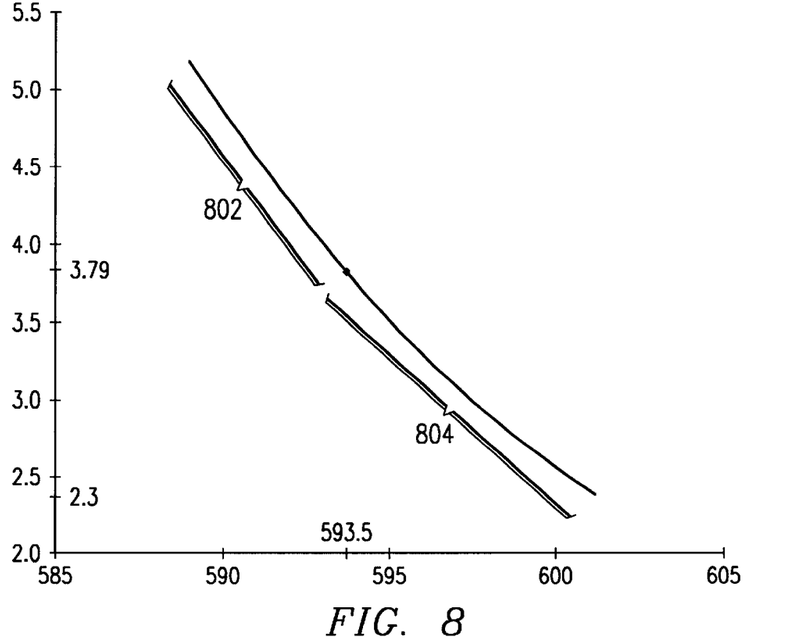
FIG. 8 is a plot showing the relationship between efficiency and cutoff wavelength for a typical red filter.
Figure 9:
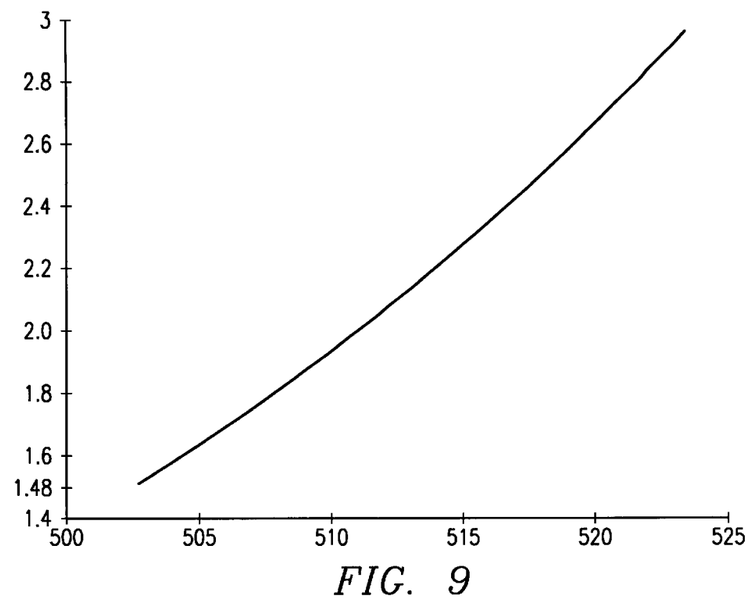
FIG. 9 is a plot showing the relationship between efficiency and cutoff wavelength for a typical blue filter.

FIG. 7 shows the relationship between the green longwave cutoff wavelength and efficiency for one type of dichroic filter coupled with a metal halide light source. The filter characterized in FIG. 7 has a shortwave cutoff wavelength of 475 nm. FIG. 8 shows the relationship between the red shortwave cutoff wavelength and efficiency for a corresponding red dichroic filter. The red longwave cutoff wavelength is out of the visible range. FIG. 9 shows the relationship between the blue longwave cutoff wavelength and efficiency for a corresponding blue dichroic filter. The blue shortwave cutoff wavelength also is out of the visible range.

As seen in FIGS. 7–9, a color wheel formed by combining each of the three color filters may have an overall efficiency as low as 23.02%, well below the specified minimum of 26.5%. The green longwave cutoff and the red shortwave cutoff are the largest contributors to the variance in the overall color wheel's output. Unfortunately, these cutoff wavelengths cannot be more closely controlled without raising substantially increasing the cost of the color wheel. Therefore a method of optimizing the fabrication of a color wheel is needed that will closely control the overall white efficiency variance of the completed color wheels without degrading the display system's color purity or substantially increasing the cost of the color wheel. The same need arises when matching color sources, whether light sources, color filters, or beam splitters, that exhibit unit-to-unit variances.

A method of selecting color sources has been discovered that reduces the variance in lumens output by a display system, improves the white color purity of the display system, and has only a minor impact on the cost of producing the display system Although the concepts of the disclosed invention are applicable to any type of color display system, and are applicable to the selection of light sources, filters, and beam splitters, the disclosed invention is best illustrated in terms selecting color filters for a filter-based color display system.

This method may be summarized as characterizing each color source produced for at least two of the colors, and avoiding the combination of an inefficient source for each of the two colors tested. In practice, implementing the selection method requires characterizing each filter tested and grouping, or binning, the filter based on its performance characteristics at the component test manufacturing level. During the system build cycle, filters are chosen from groups or bins chosen to ensure compatibility with the other filters combined into a given system.

In order to fabricate a color wheel having an efficiency of at least 26.5% from the filters described above and characterized by FIGS. 7–9, both the green and red filters are divided into two groups. These groups are shown as a high efficiency green group 702, and a low efficiency green group 704 in FIG. 7, and a high efficiency red group 802, and a low efficiency red group 804. The groups into which the filters are placed are determined such that a minimally efficient blue filter, coupled with a minimally efficient filter from a second color, either red or green, coupled with a minimally efficient filter from the high efficiency group of the third color, either green or red, will meet or exceed the minimum efficiency requirements of the color wheel. That is, sorting the filters into these filter groups, or bins, and never matching two filters from the green and red low efficiency groups 704 and 804, prevents building color wheels which will not meet the color wheel efficiency specification.

Table 2 shows the worst case efficiency characteristics for the three allowable combinations of red and green filters as well as the impermissible combination of low efficiency green coupled with low efficiency red filters. As shown by Table 2, the only impermissible combination is a low efficiency red filter coupled with a low efficiency green filter.

TABLE 2

| Red Bin | Green Bin | Min. Red Efficiency | Min. Green Efficiency | Min. Blue Efficiency | Min. Wheel Efficiency | Color Wheel Pass/Fail |
|---|---|---|---|---|---|---|
| L | L | 2.30 | 21.24 | 1.48 | 25.02 | Fail |
| L | H | 2.30 | 23.67 | 1.48 | 27.45 | Pass |
| H | L | 3.79 | 21.24 | 1.48 | 26.51 | Pass |
| H | H | 3.79 | 23.67 | 1.48 | 28.94 | Pass |

Figure 10:
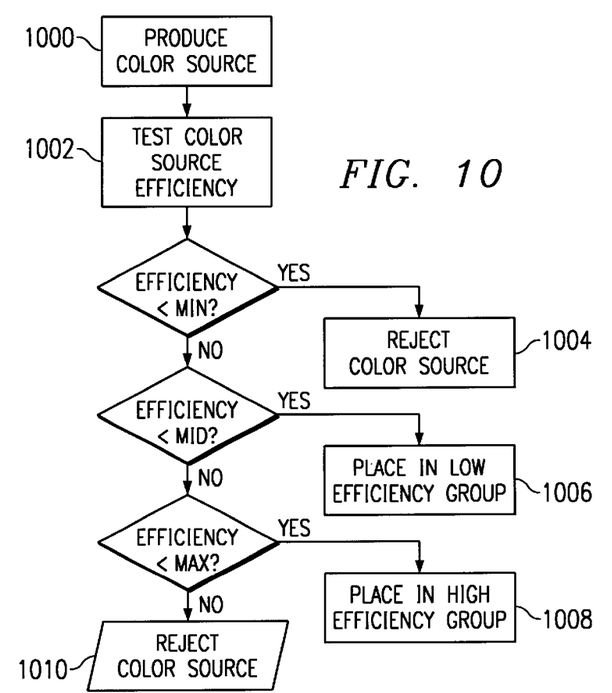
FIG. 10 is a flowchart detailing the color source sorting process.
Figure 11:
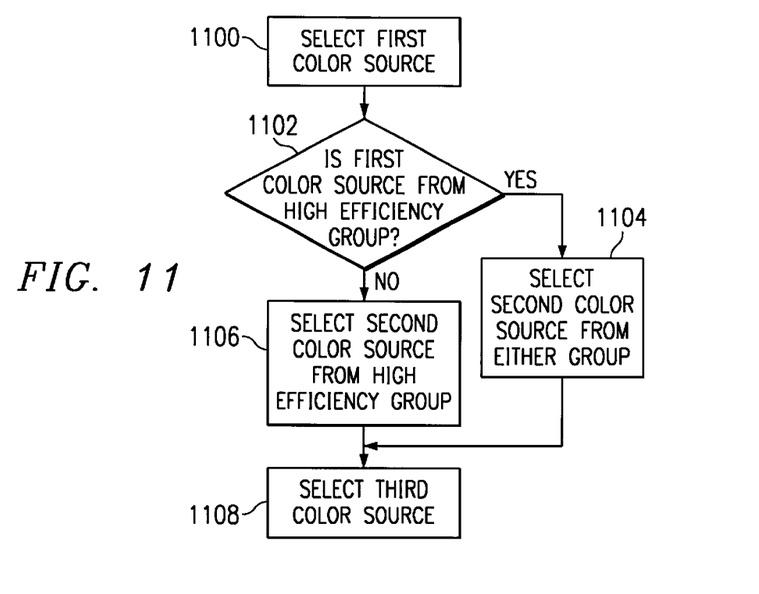
FIG. 11 is a flowchart detailing the color source selection process.
Figure 12:
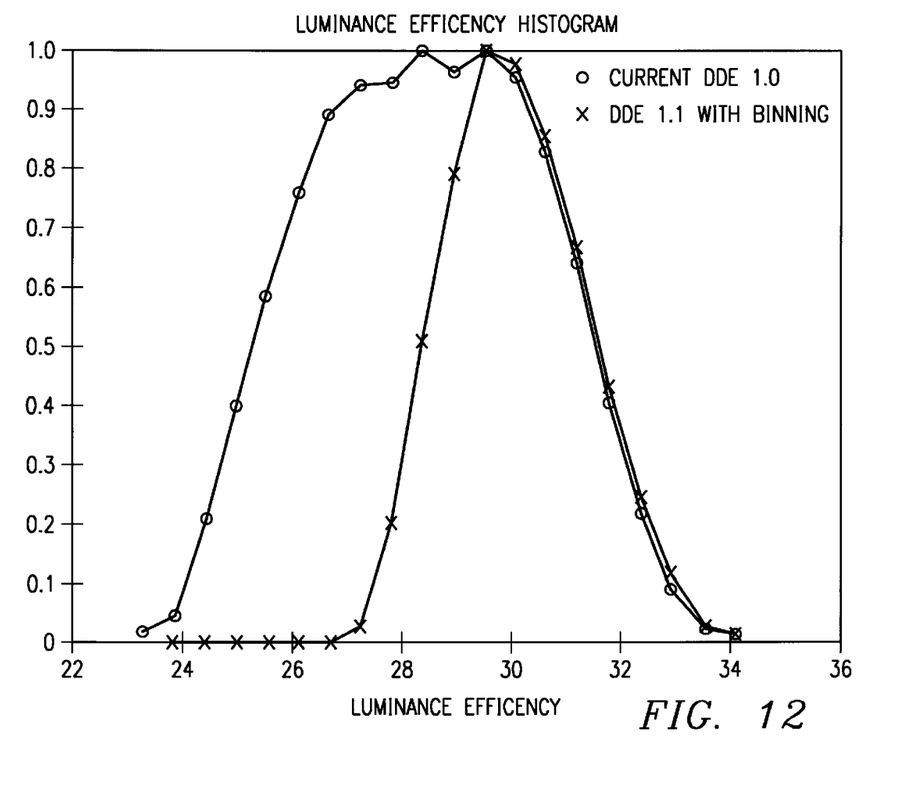
FIG. 12 is histogram showing the luminance efficiency of a color wheel with and without color filter binning showing the reduced variance occurring with filter binning.

FIGS. 10 and 11 are flowcharts depicting the process of testing and selecting the color sources. In FIG. 12, a color source is produced in block 1000, and tested in block 1002. If the measured efficiency of the color source is less than a minimum allowable efficiency, the color source is rejected in block 1004. If the measured efficiency exceeds the minimum allowable efficiency but does not exceed a midpoint efficiency, the color source is placed in a low-efficiency group in block 1006. If the measured efficiency exceeds the midpoint efficiency but does not exceed a specified maximum allowable efficiency, if any, the color source is placed in a high-efficiency group by block 1008. If the measured efficiency of the color source exceeds a specified maximum allowable efficiency, if any, the color source is rejected in block 1010.

Other measurements may replace or serve as a surrogate for the efficiency measurement. As discussed above, the cut-off wavelengths of a dichroic color filter largely determine the efficiency of the color filter. Therefore, according to one embodiment of the present invention, the cut-off wavelengths of the dichroic filters are measured and the filters are sorted according to the results of that measurement.

Figure 13:
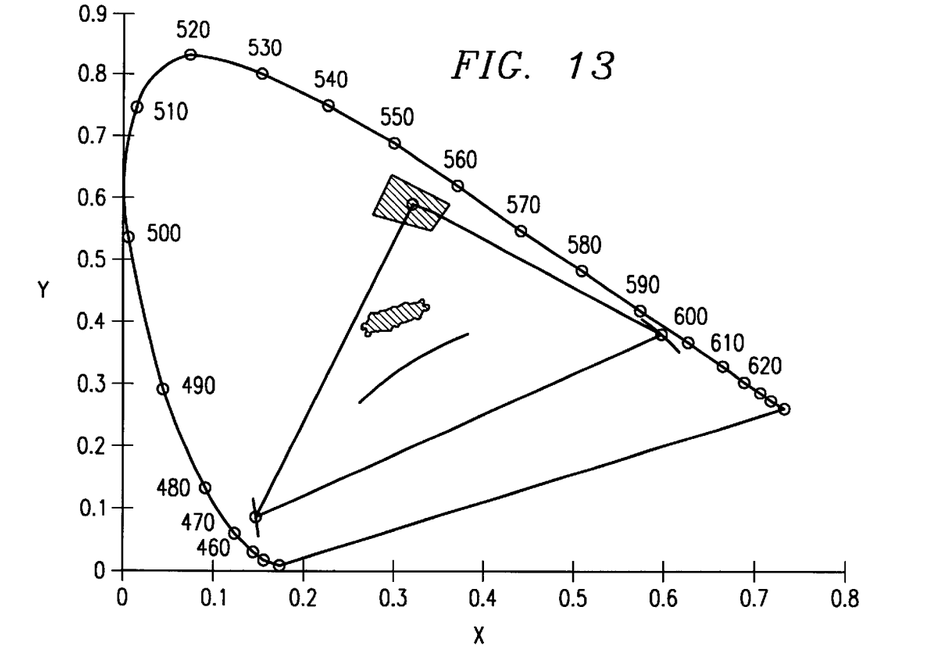
FIG. 13 is a plot of the red, green, and blue xy chromaticity variations of typical red, green, and blue filters making up a color wheel without binning, and the white xy chromaticity of the combined output of the filters.

FIG. 13 shows the process for selecting color filters for a given system that ensures the system efficiency will meet the specified minimum efficiency. According to FIG. 13, a first color source is selected in block 1100. If the selected first color source is chosen from the high-efficiency group, a second color source is selected from either the high-efficiency or low-efficiency color source group as shown in block 1102. If the selected first color source is chosen from the low-efficiency color source group, the second color source must be selected from the high-efficiency color source group as shown in block 1104.

Several methods exist by which to define the measurement midpoints which define the bins, or groups, into which the filters are sorted. Regardless of the method chosen, the cost of sorting and selecting is minimized if the number of filters sorted, as well as the number of parameters tested, and the number of available bins is minimized In the case of the color wheel described above, the blue and green shortwave cutoff wavelengths did not contribute enough variance to the final color wheel efficiency to warrant sorting the filters by these parameters. The only two filter parameters responsible for the majority of the efficiency variance were the green longwave and red cutoff wavelengths.

A first method of selecting filter bins is to evenly divide one of the ranges into two bins. For example, the red filter efficiency varies between 2.3% and 5.27% and the bins are selected such that half of this range is in each bin— efficiencies over 3.785% are grouped into the high efficiency group 802. Given the minimum efficiency of 3.79% for the high efficiency group of red filters, the green filter can be no less than 21.24% efficient in order to still meet the overall color wheel efficiency specification. As shown by FIG. 7, green filters over the allowable range of longwave cutoff wavelengths, 578 nm +/–1%, are as little as 19.24% efficient, much lower than the 21.24% required to guarantee an acceptable color wheel when coupled with any blue filter and a minimally efficient red filter from the high efficiency group 802. Therefore green filters less than 21.24% efficient 706 are discarded. The remaining green longwave range, from 21.24% to 26.11% efficient, is equally divided into a high efficiency range 702 and a low efficiency range 704.

A second method of selecting filter bins is to select the minimum efficiency which ensures the completed color wheel will pass specification. Given a minimum color wheel efficiency of 26.5% and the range of efficiencies described by FIGS. 7–9, the cutoff between the high efficiency green filter bin 702 and the low efficiency green filter bin 704 could be reduced to 22.72% since the minimal efficiency contribution of the red and blue filters will be 3.78%. Likewise, using a minimum efficiency of 21.24% for the green filter, the high efficiency red group 802 is defined as including all filters having an efficiency of 3.78% and above.

Other methods of defining the filter bins are easily devised. Some methods require some knowledge of the distribution of efficiencies within each filter type. For example, the bins could be defined to minimize the number of filters in the low efficiency groups 704, 804. Although the filters need not be evenly distributed between each group, if the number of low efficiency filters from a first color exceeds the number of high efficiency filters from the second color the selection process will create waste.

Additional embodiments divide filter ranges into more than two bins, and devise matching algorithms that ensure paired filters meet the system level specifications. For example, two colors are sorted into three bins with the acceptable combinations being, a low-efficiency filter from either color must be paired with a high-efficiency filter from the other color, and two mid-efficiency filters may be combined. Alternatively, more than two colors are sorted and no more than two or three of the color sources chosen may be low-efficiency sources.

The same selection methods are also applicable to color wheels which have more than one segment for a given color. When selecting multiple filters of the same color for the same color wheel, the filters typically should be selected from the same bin. Selecting the filters from the same bin prevents image artifacts from being created by the display system. These image artifacts are created because not all of the bits will be displayed equally by both of the segments, and because the two segments selected from different bins of the same color may have a visible color difference. If only the one color is displayed on the screen, and if the intensity of the color signal is increased across the screen from side to side, the color difference will appear as vertical bands of color in addition to the side to side brightness increase.

In addition to preventing the manufacture of color wheels, or combinations of color sources, that will not meet efficiency specifications, display systems 100, 200 having color sources 102 and color wheels 202 which are fabricated using these selection methods exhibit reduced unit-to-unit brightness and color purity variations. FIG. 12 is a Monte Carlo plot of the efficiency distribution for a color wheel using the filters described above with and without color filter binning. As shown in FIG. 12, the average color wheel efficiency has increased 4%. Additionally, the binning process reduced the overall standard deviation by about 50%.

Figure 14:
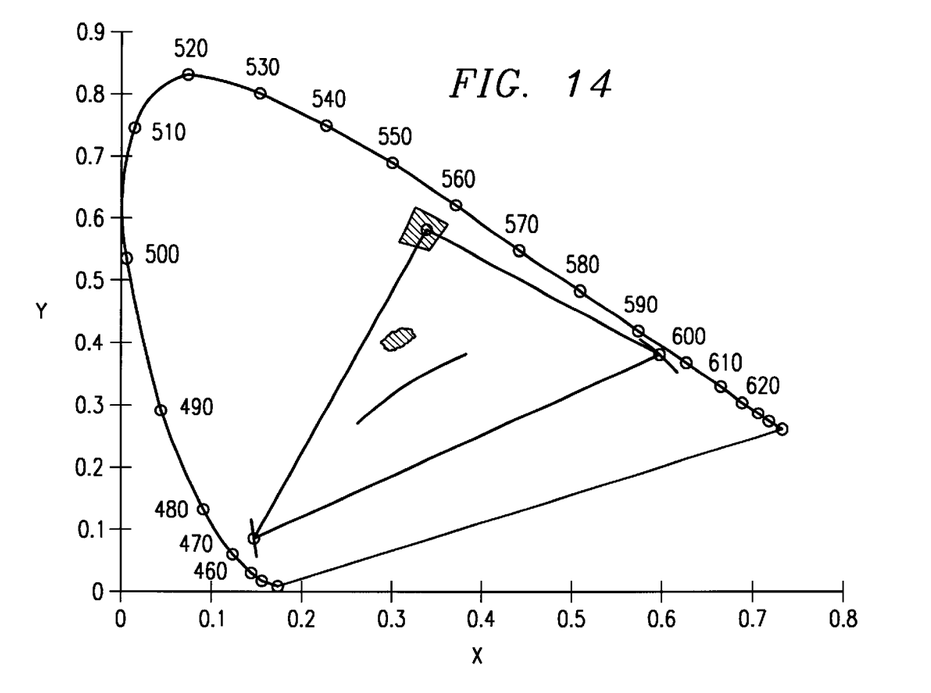
FIG. 14 is a plot of the red, green, and blue xy chromaticity variations of typical red, green, and blue filters making up a color wheel with binning, and the white xy chromaticity of the combined output of the filters showing reduced variance compared to FIG. 13.

FIG. 13 shows the red, green, blue, and white xy chromaticity variations of a color wheel using the filters described above without binning. FIG. 14 shows the red, green, blue, and white xy chromaticity variations of a color wheel using the filters described above with binning. As shown in FIG. 14, the variation of both the green and white xy chromaticity has been decreased. The reduction in the green xy chromaticity variation has decreased primarily due to the exclusion of the very inefficient filter material 706, while the decrease in variation of the white xy chromaticity is due to avoiding the combination of a low efficiency green filter and a low efficiency red filter.

Thus, although there has been disclosed to this point a particular embodiment for an image display system having color sources optimized to increase image brightness and method of selecting color sources, it is not intended that such specific references be considered as limitations upon the scope of this invention except in-so-far as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of selecting a set of color sources for an image display system, said image display system creating a color image from at least three single-color color sources, said method comprising:
   providing multiple first color sources, said multiple first color sources divided into a high-efficiency group and a low-efficiency group based on said first color source's efficiency;
   providing multiple second color sources, said second color sources divided into a high-efficiency group and a low-efficiency group based on said second color source's efficiency;
   providing multiple third color sources; and
   selecting a first, second, and third color source from said multiple first, second, and third color sources such that one and only one of said first and said second color sources are selected from said low-efficiency groups.

2. The method of claim 1, said steps of providing multiple first, second, and third color sources comprising the steps of providing multiple first, second, and third color filters.

3. The method of claim 2, further comprising the step of attaching said selected first, second, and third color filters to a hub to form a color wheel.

4. The method of claim 1, said steps of providing multiple first, second, and third color sources comprising the steps of providing multiple first, second, and third dichroic filters.

5. The method of claim 1, said steps of providing multiple first, second, and third color sources comprising the steps of providing multiple red, green, and blue color sources.

6. The method of claim 1, said step of selecting a first color source from said multiple first color sources comprising selecting at least two first color sources from said multiple first color sources, wherein said two first color sources and said second color source are not both chosen from said low-efficiency groups.

7. The method of claim 1, said step of selecting a second color source from said multiple second color sources comprising selecting at least two second color sources from said multiple second color sources, wherein said first color source and said two second color sources are not both chosen from said low-efficiency groups.

8. The method of claim 1, further comprising the steps of:
   providing multiple fourth color sources; and
   selecting a fourth color source from said multiple fourth color sources.

9. The method of claim 8, said fourth color source for providing white light.

10. The method of claim 1, said multiple first and second color source divided into a high-efficiency group and a low-efficiency group based on measurement of a surrogate parameter.

11. The method of claim 10, each of said first and second color sources having at least one cut-off wavelength, said surrogate parameter being said at least one cut-off wavelength.

12. The method of claim 1, wherein at least one of said multiple color sources is divided into more than two groups.

13. The method of claim 1, wherein color sources for more than two colors are divided into efficiency groups.

14. A method of selecting a set of color sources for an image display system, said image display system creating a color image from at least three single-color color sources, said method comprising:
   providing multiple first color sources, each said first color source for transmitting light over a first range of wavelengths; said first range of wavelengths comprised of a first sub-range and a second sub-range, said first sub-range comprising longer wavelengths than said second sub-range;
   providing multiple second color sources, each said second color source for transmitting light over a second range of wavelengths; said second range of wavelengths comprised of a first sub-range of said second range and a second sub-range of said second range, said first sub-range of said second range comprising longer wavelengths than said second sub-range of said second sub-range;
   providing at least one third color source;
   testing said first and said second color sources to determine over which sub-range they transmit light;
   selecting a first color source from said multiple first color sources;
   selecting a second color source from said multiple second color sources, said second color source chosen from a sub-range of said second range ensuing that a first color source from said second sub-range is not combined with a second color source from said first sub-range of said second range; and
   selecting a third color source from said multiple third color sources.

15. The method of claim 14, said steps of providing multiple first, second, and third color sources comprising the steps of providing multiple first, second, and third color filters.

16. The method of claim 15, further comprising the step of attaching said selected first, second, and third color filters to a hub.

17. The method of claim 14, said steps of providing multiple first, second, and third color sources comprising the steps of providing multiple first, second, and third dichroic filters.

18. The method of claim 14, said steps of providing multiple first, second, and third color sources comprising the steps of providing multiple red, green, and blue color sources.

19. The method of claim 14, said step of selecting a first color source from said multiple first color sources comprising selecting at least two first color sources from said multiple first color sources, wherein said two first color sources and said second color source are not both chosen from said low-efficiency groups.

20. The method of claim 14, said step of selecting a second color source from said multiple second color sources comprising selecting at least two second color sources from said multiple second color sources, wherein said first color source and said two second color sources are not both chosen from said low-efficiency groups.

21. The method of claim 14, further comprising the steps of:
providing at least one fourth color source; and
selecting a fourth color source from said at least one fourth color source.

22. The method of claim 21, said fourth color source for providing white light.

23. A display system comprising:
a first color source chosen from a selection of first color sources, said selection of first color sources divided into a high-efficiency group and a low-efficiency group;
a second color source chosen from a selection of second color sources, said selection of second color sources divided into a high-efficiency group and a low-efficiency group, one and only one of said first color source and said second color source chosen from said low-efficiency groups;
a third color source for transmitting light over a third range of wavelengths; and
at least one spatial light modulator for receiving light from said first, second, and third color sources, modulating said received light, and for transmitting said modulated light to an image plane.

24. The display system of claim 23, further comprising a fourth color source.

25. The display system of claim 23, said first, second, and third color sources being first, second, and third color filters.

26. The display system of claim 23, wherein said first, second, and third color sources are first, second, and third color filters attached to a hub forming a color wheel.

27. The display system of claim 23, wherein said first, second, and third color sources are first, second, and third dichroic filters.

28. The display system of claim 23, said first color source comprising at least two first color sources, said two first color sources selected from the same efficiency group, wherein said first and said second color sources are not all chosen from said low-efficiency group.

29. The display system of claim 23, said second color source comprising at least two second color sources, said two second color sources selected from the same efficiency group, wherein said first and said second color sources are not all chosen from said low-efficiency group.

30. The display system of claim 23, wherein said multiple first and second color sources are divided into a high-efficiency group and a low-efficiency group based on measurement of a surrogate parameter.

31. The method of claim 30, wherein each of said first and second color sources have at least one cut-off wavelength, said surrogate parameter being said at least one cut-off wavelength.

* * * * *